United States Patent Office 3,632,683
Patented Jan. 4, 1972

3,632,683
SYNTHETIC RESIN CONTAINING
VINYLPYRIDINE
Carmen M. Cusano, Poughkeepsie, N.Y., assignor to
Texaco Inc., New York, N.Y.
No Drawing. Filed June 26, 1968, Ser. No. 740,083
Int. Cl. C08f *15/04, 1/13, 7/12*
U.S. Cl. 260—880 R     4 Claims

ABSTRACT OF THE DISCLOSURE

A synthetic resin of improved impact strength consisting of a graft copolymer of crosslinked polybutadiene, acrylonitrile, styrene and vinylpyridine having a component weight ratio of acrylonitrile to polybutadiene to styrene to vinylpyridine of between about 25:10:60:5 and 25:30:25:20, said polybutadiene component having an average particle size between about 400 and 1500 A. and a gel content between about 60 and 90 wt. percent.

BACKGROUND OF INVENTION

This invention pertains to the area of synthetic resin art relating to the graft copolymers resulting from the reaction between a conjugated diolefin polymer and a vinylidene aromatic, acrylonitrile and vinylpyridine monomers.

Graft copolymers of acrylonitrile, polybutadiene and styrene are well known and widely used synthetic resins and are commonly referred to as ABS thermoplastic material. They are composed of a polybutadiene rubbery backbone on which is grafted styrene-acrylonitrile copolymer. Described in another manner, ABS resins are looked upon as the dispersions of a rubbery phase of polybutadiene in a rigid matrix of styrene-acrylonitrile copolymer, the copolymer being chemically bound to the rubbery phase. The graft ABS type resins are useful as plastic materials in the manufacture of refrigerators, shoe heels, telephones, plastic pipes, machine housings and etc.

The properties of the ABS resins in respect to resistance of impact, resistance to heat deformation (heat deflection) and tensile strength are in large measure controlled by the particular ratio of monomers therein. Increase of the polybutadiene content in the polymer with a corresponding decrease in the styrene and/or acrylonitrile normally results in a graft product which has increased resistance to impact and greater flexibility, but undesirably reduced tensile strength and reduced resistance to heat deformation. Contrary, if the acrylonitrile and/or styrene content are increased in respect to the polybutadiene in the graft polymer, normally the tensile strength and heat deformation resistance properties increase while the resistance to impact and flexibility undesirably decreases. As the demand for stronger and stronger plastics takes place, it is an increasing problem in the art to provide an ABS type resin of increasingly improved impact resistance without substantially affecting in a deleterious manner resistance to heat deformation and tensile strength.

SUMMARY OF INVENTION

I have discovered and this constitutes my invention, a new graft ABS type polymer of increased resistance to impact while substantially maintaining the same resistance to heat deformation and tensile strength. More specifically, I have discovered a novel graft polymer composed of a non-linear crosslinked polybutadiene (B) backbone with acrylonitrile (A), styrene (S) and vinylpyridine (VP) terpolymer grafted thereon having an A:B:S:VP weight ratio of between about 25:10:60:5 and 25:30:25:20, said polybutadiene component having an average particle size between 400 and 1500 A. (angstroms) and a gel content of between about 60 and 90 wt. percent.

Hereinbefore and hereinafter "gel content" is defined as the toluene insoluble portion of the polybutadiene after heating a mixture of 1 gram polybutadiene in 200 cc. toluene at reflux for 15 hours.

DETAILED DESCRIPTION OF THE INVENTION

The graft polymer contemplated herein is an ABS type resin theoretically composed of a non-linear crosslinked polybutadiene backbone to which there is grafted terpolymers of acrylonitrile, styrene and vinylpyridine. Broadly, the polymer is prepared via a two-step procedure in which an aqueous polybutadiene emulsion (polybutadiene latex) is prepared in a first step by polymerizing butadiene via aqueous emulsion polymerization until a crosslinked polybutadiene is obtained having a gel content between about 60 and 90 wt. percent and an average particle size of about 400 to 1500 A. Then as a second step contacting the resultant polybutadiene latex with a mixture of acrylonitrile, styrene and vinylpyridine monomers under aqueous emulsion polymerization conditions until a resin is obtained which has an A:B:S:VP weight ratio content of between about 25:10:60:5 and 25:30:25:20. Example properties of the resultant graft polymer are Izod Impact strength (ASTM D–256) between about 9 and 15 ft./lb./inch notch (compression molded test sample), a heat deflection temperatures (ASTM D–648, Mod) of between about 83 and 85° C., and a tensile strength (ASTM D–638, Proc. A) of between about 4000 and 5000 p.s.i. It is to be noted the ASTM D–648 heat deflection test has been modified to call for a .02" deflection rather than a .01" deflection.

In greater detail, in the first step emulsion polymerization butadiene, water, anionic emulsifier, polymerization initiator and polymerization modifier are charged to a pressure reactor in the absence of free oxygen and heated to a temperature of between about 50 and 65° C., preferably between about 60 and 65° C., for a period normally between about 7.5 and 25 hours and in any case until a polybutadiene is formed having a conversion (basis butadiene) of 60 and 90 wt. percent, a gel content of between about 60 and 90 wt. percent, a particle size range of between about 200 and 2000 A., and an average particle size range of between about 400 and 1500 A. The conditions of polymerization normally take place under conditions of agitation, e.g., stirring or tumbling of the reactor. The crosslinked polybutadiene rubber product is normally worked up by adding a chain stopper to the crude latex product as it comes out of the reactor in a heavy cream to whipped cream consistency. The crude product is then diluted with water, if necessary, to form a latex having a solids content of about 25–35 wt. percent. The purpose of this dilution step is to promote filtration. The resultant aqueous mixture is subject to reduced pressure or steam blow to remove unreacted butadiene, and then the residue is filtered to remove coagulated polybutadiene. In the first stage the butadiene and water contents in the initial reaction mixture generally range between about 20 and 50 wt. percent and between about 50 and 80 wt. percent, respectively.

In the second stage the crosslinked polybutadiene latex filtrate from the first stage is charged to a reactor followed by the addition of anionic emulsifier, polymerization initiator, modifier, styrene, acrylonitrile, vinylpyridine and additional water if necessary to obtain the desired dilution. The reaction ingredients are agitated in the absence of oxygen at a temperature of between about 60 and 65° C. for a period normally between about 3 and 5 hours, generally until a yield of at least about 95 wt. percent is obtained, and in any case until a synthetic resin is produced having an A:B:S:VP component weight ratio between about 25:10:60:5 and 25:30:25:20. In the initial reaction mixture of the second step the acrylonitrile, polybutadiene, styrene and vinylpyridine quantities are normally added in the ratio desired in the final product.

The resultant graft copolymer is recovered from the reaction mixture by standard means such as coagulating the emulsion by the addition of a dilute aqueous acid such as hydrochloric and sulfuric acid or coagulating with aqueous salts solutions such as saturated aqueous alum and calcium chloride solutions in the presence of polymer stabilizer. The coagulated mixture is filtered and the recovered solids are washed with water and dried. The resultant synthetic resin solids can be milled and molded for use.

Both in the first and second steps, the presence of oxygen is undesirable in that it inhibits polymerization. The absence of oxygen is brought about by standard means such as conducting the reaction under a blanket of inert gas such as nitrogen. Further, in both steps if necessary strong alkali is employed such as sodium hydroxide or potassium hydroxide to maintain reaction pH between about 8 and 10.

Examples of the vinylpyridines contemplated herein are the 2-vinylpyridine, 3-vinylpyridine, 4-vinylpyridine and 2-methyl-5-vinylpyridine.

The quantities of polymerization initiator employed in Steps I and II range between 0.25 and 1.0 wt. percent based on the particular initiator involved. Examples of the initiators contemplated herein are the water soluble polymerization initiators such as hydrogen peroxide, sodium peroxide, sodium perborate, sodium persulfate and the potassium and ammonium salts of the foregoing and other peroxy acids and water soluble compounds containing the peroxy radical —O—O—. Normally, of the water soluble initiators potassium persulfate is preferred. In addition, organic hydroperoxides may be utilized in combination with a reducing agent such as di-isopropylbenzene hydroperoxide and in combination with dextrose, sodium pyrophosphate and ferrous sulfate. This latter system is commonly referred to as a redox system.

The anionic emulsifier quantity in Steps I and II are normally utilized in amounts of between about 0.3 and 5 wt. percent based on the particular reaction mixture employed. Examples of the anionic emulsifiers contemplated herein are the water soluble salts of the fatty acids such as the sodium and potassium salts of stearic, lauric, myristic, palmitic and oleic acids as well as the rosin acid soap salts. Additional examples are the alkali metal salts of sulfonated hydrocarbons such as sodium lauryl sulfonate, sodium dodecyl sulfonate and sodium dodecylbenzene sulfonate. The function of the emulsifier is to maintain the reactants and products in aqueous dispersion.

The modifiers are employed in the first and second steps in an amount of between about 0.15 and 0.8 wt. percent based on the particular reaction mixture employed. Among the modifiers contemplated herein are the alkyl mercaptans of from 12 to 16 carbons such as n-dodecyl mercaptan, t-hexadecyl mercaptan, a mixture of t—$C_{12}$–$C_{16}$ alkyl mercaptans. In addition, other examples are dihydrocarbyl disulfides wherein the hydrocarbyl group is from 1 to 16 carbons including alkaryl, aryl, alkyl and aralkyl such as dibutyl disulfide, diphenyl disulfide, and dibenzyl disulfide. The modifiers function to regulate the molecular weight of the products.

The chain stoppers employed function to terminate polymerization by eliminating the free radicals present and are normally incorporated in the final mixture in amounts of the order of a 0.1 wt. percent. Examples of chain stoppers contemplated herein are sodium dimethyl dithiocarbamate, sodium diethyl dithiocarbamates, sodium dithionite, hydroquinone, phenyl hydrazine and sodium sulfide.

To the final resin product of the invention there may be added the standard additives such as antioxidants and stabilizers, e.g., di-t-butyl-p-cresol and phenyl β-naphthylamine, and tris nonylphenyl phosphite. These stabilizers are normally incorporated in the final resin in amounts of between about 0.4 and 1.0 wt. percent, preferably before recovery of the resin from the final emulsion.

The following examples further illustrate the invention but are not to be construed as limitations thereof.

EXAMPLE 1

This example (Run 3) illustrates a species of the synthetic resin of the invention and its method of preparation. Further, Runs 1 and 2 are comparative preparations.

The polymerization recipes prepared are presented below

STEP I—POLYMERIZATION RECIPE

| Ingredients: | Parts by weight |
| --- | --- |
| 1,3-butadiene | 100 |
| Water | 80 |
| Sodium oleate | 1.5 |
| Potassium persulfate | 0.25 |
| n-Dodecyl mercaptan | 0.15 |
| Sodium hydroxide | 0.014 |

STEP II—POLYMERIZATION RECIPE

| Ingredients: | Parts by weight |
| --- | --- |
| Polybutadiene latex [1] (Runs 1 and 3; 2) | 100; 124 |
| Styrene (Runs 1 and 2; 3) | 50; 50 |
| Acrylonitrile (Runs 1 and 3; 2) | 25; 19 |
| 4-vinylpyridine (Run 3) | 10 |
| Sodium alkylaryl sulfonate [2] | 2 |
| Dextrose | 1 |
| Sodium pyrophosphate decahydrate | 0.83 |
| Sodium hydroxide | 0.150 |
| Ferrous sulfate | 0.007 |
| t-Hexadecyl mercaptan | 0.5 |
| Cumene hydroperoxide | 0.75 |
| Water | 160 |

[1] Aqueous crosslinked polybutadiene latex in Runs 1 and 3 containing 25 ft. percent polybutadiene of a gel content of 80 wt. percent, an average particle size of about 550 A. and produced in a yield basis butadiene of about 75 wt. percent. In Run 2 about same but average particle size was 800 A.
[2] A mixture of $C_{12}$-$C_{16}$ alkyl benzene sulfonate and $C_{12}$-$C_{16}$ alkyl naphthalene sulfonate.

REACTION DATA

| Test data | Run 1 | Run 2 | Run 3 |
| --- | --- | --- | --- |
| Step I temp., °C | 65 | 65 | 65 |
| Step I time, hrs | 20 | 12 | 20 |
| Step II temp., °C | 4 | 65 | 64 |
| Step II time, hrs | 4 | 3 | 4 |
| Latex soap conc., gr./100 gr. monomer in Step II | 2.85 | 2.85 | 2.85 |
| Wt. percent conversion to graft copolymer Step II | 97 | 97 | 94 |

STEP II PRODUCT

| Test data | Run 1 | Run 2 | Run 3 |
| --- | --- | --- | --- |
| Weight ratio in Step II product of A:B:S:4VP | 25:25:50:0 | 19:31:50:0 | 25:25:40:10 |
| Izod impact ft. lb./inch notch [1] | 2.2 | 9.0 | 11.1 |
| Heat deflection temp., °C | 85 | 87 | 85 |
| E. modulus×$10^{-3}$, p.s.i | 227 | 176 | 184 |
| Tensile strength, p.s.i | 5500 | 3700 | 4200 |

[1] Test sample compression molded.

It is to be noted in comparative Run 2 if the polybutadiene component was of a particle size of Runs 1 and 3, i.e., about 550 A. rather than 800 A. the Izod impact would be substantially less than 9. If a 9 rating is desired in Run 2 and the particle size is 550 A. rather than 800 A. substantially more polybutadiene will have to be added with the result the tensile strength will be substantially below 3700 p.s.i. This further emphasizes together with the data of Run 1, the outstanding properties of the polymer of the invention as represented by Run 3.

In background, polymerization was effected in all cases in a 30 ounce "pop" bottle capped with crown closures in which the cork had been replaced by a rubber gasket. In respect to Step I to a "pop" bottle there was charged a 1.5 wt. percent soap solution of sodium oleate via pipet followed by the addition of the n-dodecyl mercaptan, potassium persulfate, sodium hydroxide (to adjust pH in the 8 to 10 range) as a 0.4 wt. percent aqueous solution which had been used as a rinse to insure nearly quantitive addition of the mercaptan. The remaining water which makes up the difference between the soap solution and the total amount of water required was then added. It is to be noted that water employed in the procedure is boiled demineralized water, cooled and stored under a blanket of nitrogen to remove dissolved oxygen. The bottle was then blanketed with nitrogen and stoppered and chilled in an ice-hydrochloric acid bath at $-5°$ C. for approximately ½ hour. The bottle was tared and liquid 1,3-liquid butadiene was added in an amount in excess of that required and the bottle capped when the correct amount of butadiene had distilled. The chilled (about 0° C.) bottle was shaken to emulsify the butadiene monomer before being placed in the polymerization bath. The bottle was then rotated and at a speed of 20 r.p.m. beneath the surface of the bath water thermostated at $65\pm1°$ C. After the desired time had elapsed the bottle was removed from the bath and allowed to cool at room temperature. The bottle containing the resultant crosslinked polybutadiene product and residual unreacted butadiene was cooled to ice bath temperatures before opening. The bottle was tared and opened allowing excess butadiene to escape. A quantity of 15–75 mls. (in order to give 25–35% polymer content) of water was added along with two drops of a saturated chain stopping solution of sodium diethyl dithiocarbamate to destroy any free radicals still present. The bottle was then capped and shaken to make the latex homogeneous. The bottle was opened and placed under vacuum for about 15 minutes to remove unreacted butadiene trapped in the polymer. The latex was reweighed to determine a coversion factor and filtered using a coarse screen of 100 mesh (U.S. Standard). The polymer content of latex was determined gravimetrically. The latex particle size was determined by electron microscopy.

In Step II of the procedure a 2 wt. percent aqueous solution of the sodium alkylaryl sulfonate was pipeted into a pint bottle. The dextrose, sodium pyrophosphate, and ferrous sulfate were then added as dry powders and swirled vigorously until they were dissolved. Sodium hydroxide was added as a 5 wt. percent aqueous solution to adjust pH in the 8 to 10 range. The acrylonitrile, styrene and 4-vinylpyridine were added. A portion of the styrene was used to rinse in t-hexadecyl mercaptan. The pint bottle was capped and shaken vigorously to emulsify the monomers. The emulsified monomers along with cumene hydroperoxide were added to a "pop" bottle containing a weighed amount of polybutadiene latex, said polybutadiene derived from Step I. The remaining amount of water was added to rinse in the emulsified monomers and cumene hydroperoxide. The bottle was blanketed with nitrogen and capped. The bottle was placed in the bath at $65\pm1°$ C. and rotated end over end at 20 r.p.m. beneath the surface of the water. At the end of the reaction time the bottle was removed from the bath and cooled before being opened. The bottle was then opened and the contents poured into a 3-liter beaker containing 1.5 liters of methanol and 1 gram of phenyl $\beta$-naphthylamine. Two drops of 36 wt. percent hydrochloric acid was added to aid in the precipitation of the resin. The white resin was filtered and dried in a forced air oven for a 24 hour period a 50° C.

Example II

This example is submitted to demonstrate the advantage of incorporating the vinylpyridine in the graft rather than in the polybutadiene backbone.

The procedure steps employed in the preparation of the latex butadiene-4-vinylpyridine copolymer backbone was that described for Step I in Example I, with the exception that 4-vinyl-pyridine is introduced in conjunction with the butadiene. The polymerization recipe for Step I was as follows:

STEP I—POLYMERIZATION RECIPE

| Ingredients: | Parts by weight |
|---|---|
| Sodium oleate | 0.9 |
| 1,3-butadiene | 100 |
| Sodium hydroxide | 0.015 |
| 4-vinylpyridine | 7.5 |
| n-Dodecyl mercaptan | 0.4 |
| Potassium persulfate | 0.25 |
| Distilled water | 145 |

The reaction time was 17¾ hours at 65° C. to obtain a 94 wt. percent conversion. The product formed had a polybutadiene to 4-vinylpyridine weight ratio of about 93:7.

The procedure employed in Step II in Example I was utilized with the modification that the crosslinked polybutadiene-4-vinylpyridine prepared above was substituted for the crosslinked polybutadiene. Further, the addition of 4-vinylpyridine in the graft copolymer was eliminated and the polymerization time was 5 hours. The product was identified as a synthetic resin composed of a poly (butadiene-4-vinylpyridine) copolymer (B-VP) backbone having grafted therein the copolymer of acrylonitrile and styrene. The polymerization time was 5 hours with a graft copolymer yield of 96 wt. percent and the synthetic resin was constituted of A, B-VP and S in an A:B-VP:S weight ratio of 25:24:51. This product was compared to the A:B:S:4-VP resin of Run 3, Example I, and the former was found to be substantially inferior to the latter in respect to resistance to stress cracking and flexural strength.

Example III

This example further illustrates the products of the invention.

The overall procedure and polymer components of Example I were employed, the quantities being adjusted so that the A:B:S:VP weight ratio of the resin product was 25:15:55:5. The resultant resin product had an Izod Impact (ft. lb./inch notch) of 5.5 (compression molded sample), heat deflection temperature of 88° C., an elastic modulus ($\times 10^{-3}$) of 242 p.s.i. and a tensile strength of 4800 p.s.i.

I claim:
1. A non-linear, crosslinked graft terpolymer of styrene, acrylonitrile and vinylpyridine monomers on polybutadiene having an acrylonitrile to non-linear crosslinked polybutadiene to styrene to vinylpyridine weight ratio of between about 25:10:60:5 and 25:30:25:20, said polybutadiene component having a gel content between about 60 and 90 wt. percent and an average particle size between about 400 and 1500 A.
2. A graft polymer in accordince with claim 1 wherein said vinylpyridine is 4-vinylpyridine.
3. A graft polymer in accordance with claim 2 wherein said ratio is about 25:25:40:10, said polybutadiene component has a gel content of about 80 wt. percent and an average particle size of about 550 A.
4. A graft polymer in accordance with claim 2 wherein said ratio is about 25:15:55:5, said polybutadiene component has a gel content of about 80 wt. percent and an average particle size of about 550 A.

References Cited

UNITED STATES PATENTS 2,991,258  7/1961  Haward et al. _____ 260—880
3,442,979  5/1969  Ott et al. _____ 260—880

JAMES A. SEIDLECK, Primary Examiner

U.S. Cl. X.R.
260—29.7 UP